No. 732,316. PATENTED JUNE 30, 1903.
J. L. PHELPS.
SEED PLANTER.
APPLICATION FILED JAN. 28, 1903.
NO MODEL. 2 SHEETS—SHEET 2.
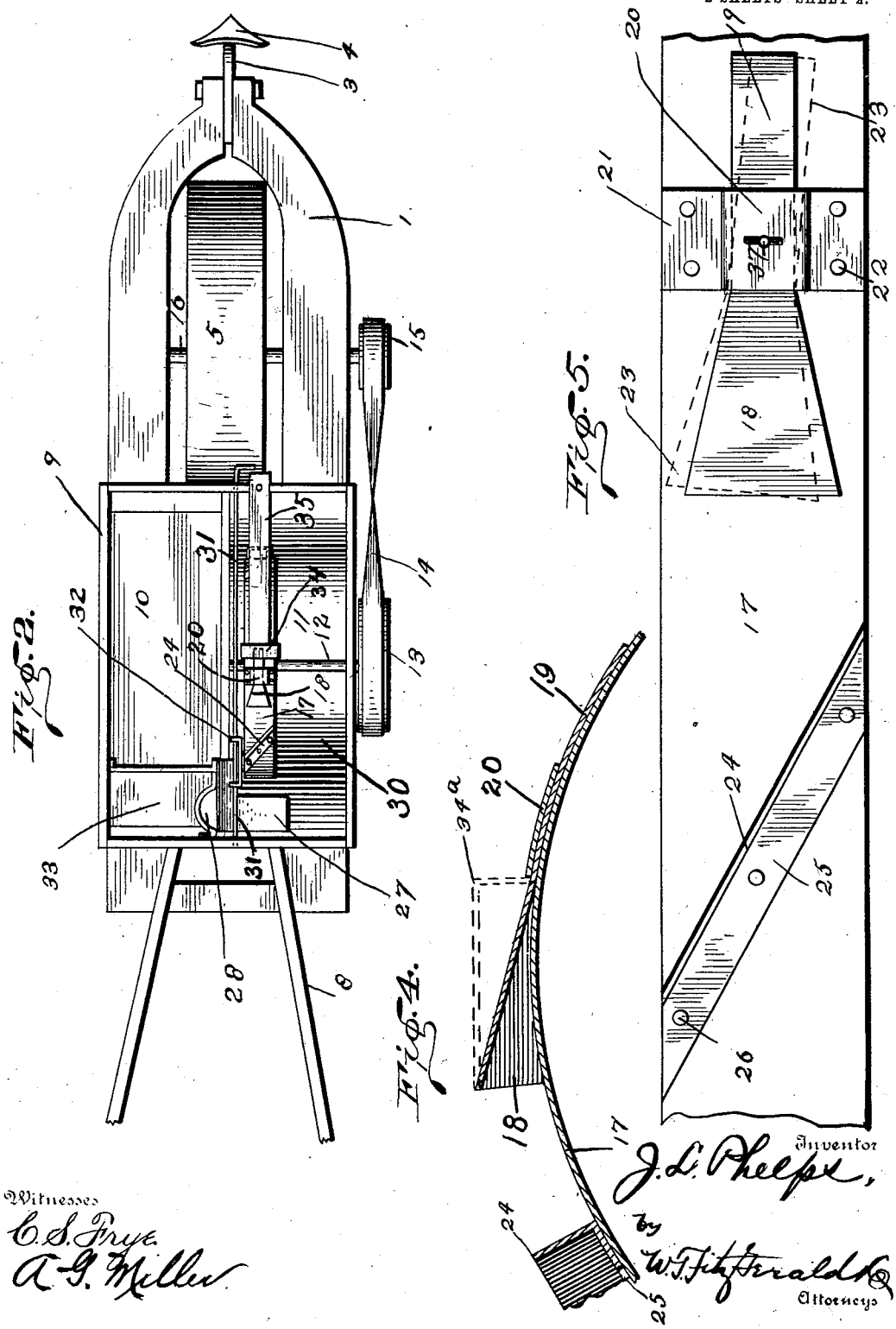

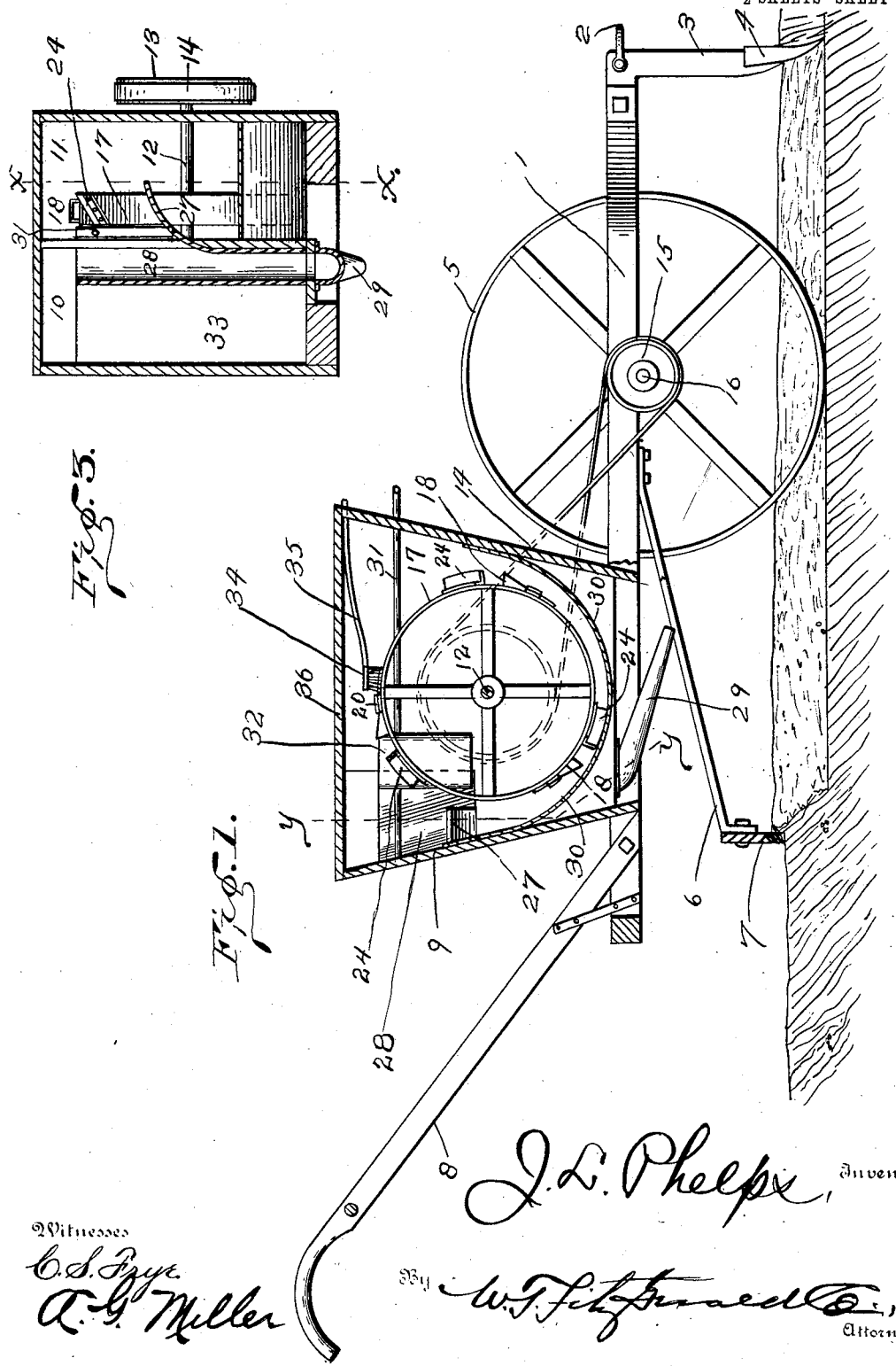

No. 732,316. Patented June 30, 1903.

UNITED STATES PATENT OFFICE.

JOHN L. PHELPS, OF EUNOLA, ALABAMA.

SEED-PLANTER.

SPECIFICATION forming part of Letters Patent No. 732,316, dated June 30, 1903.

Application filed January 28, 1903. Serial No. 140,938. (No model.)

*To all whom it may concern:*

Be it known that I, JOHN L. PHELPS, a citizen of the United States, residing at Eunola, in the county of Geneva and State of Alabama, have invented certain new and useful Improvements in Seed-Planters; and I do hereby declare the following to be a full, clear, and exact description of the invention, such as will enable others skilled in the art to which it appertains to make and use the same.

My invention relates to certain new and useful improvements in seed-planters, which, while useful for planting almost every variety of seed, will be found especially desirable and efficient for planting corn, cotton-seed, peas, beans, or the like; and my invention consists of certain novel parts the preferred construction whereof will be set forth in the following specification and pointed out in the claim.

The object of my invention, among others, is to provide an efficient planting-machine which will deliver the seed in any desired quantity and any preferred distance apart into a furrow, which the machine itself prepares and afterward covers when the seed has been introduced into the right place.

Other objects and advantages will be hereinafter made clearly apparent, reference being had to the accompanying drawings, which are made a part of this application, and in which—

Figure 1 shows a side elevation of the framework of my machine and accompanying parts, illustrating the seed-hopper and planting mechanism in section and side elevation, as indicated by line *x x* of Fig. 3. Fig. 2 is a top plan view of my invention complete ready for use. Fig. 3 is a sectional view of Fig. 1 on line *y y*. Figs. 4 and 5 are enlarged detail views showing parts of my invention.

For convenience in referring to the various elements of my invention and accessories deemed necessary to coöperate therewith numerals will be employed, the same numeral referring to a similar part throughout the several views.

Referring to the numerals on the drawings, 1 indicates the frame-section of my planter, which may be made any desired size and form and is provided with the clevis 2, to which the draft-animal is attached in the usual manner. The forward end of the frame is also provided with the depending shank 3, to which the shovel 4, of any preferred form, is secured, said shovel being designed to open the furrow within which the guiding and carrying wheel 5 is designed to travel. The framework is also provided with the rearwardly-extending arm 6, to which the covering-board 7 is secured, said board being so disposed as to cover the furrow opened by the shovel 4 behind the traction-wheel 5 and after the seed has been deposited. The framework is also provided with any preferred form of guiding-handle 8 as is common, whereby the machine may be manually controlled.

Upon the framework, preferably to the rear of the traction-wheel 5, I locate the hopper-section 9, which I prefer to divide longitudinally into two compartments 10 and 11 and within which the seed and seed-directing mechanism are disposed. Within the compartment 11 I rotatably mount the shaft 12, which extends outward through the outer wall of said compartment and has rigidly secured thereto the actuating-wheel 13, designed to receive a sprocket chain or belt 14, which extends forwardly around the driving sprocket or pulley 15, carried by a stub-shaft 16 of the traction-wheel 5, as it is by means of said pulley 15 that the wheel 13 is positively driven in the desired direction. I also rigidly secure to the shaft 12, within the compartment 11, the grain-delivering wheel 17, which is provided with grain-lifting devices consisting of a plurality of adjustable grain-holders 18, which are illustrated in detail in Fig. 5. Each of the grain-lifters 18 is provided with an integral stem-section 19, which latter is designed to extend through the loop-section 20 of the strap 21, the latter being secured to the periphery of the wheel 17 in any preferred way, as by the rivets 22. The stem-section 19 being frictionally engaged by passing it through the loop 20 enables the grain-lifting section 18 to be readily adjusted relative to the median line of the wheel, as indicated by the dotted line 23 in Fig. 5. Each of the grain-lifters 18 is provided with a complementing grain-directing flange 24, which in this instance consists of a piece of suitable material properly bent upon itself to provide the base-section 25, said base-section being secured to a suitable part of the wheel relative to the location of the grain-lifter 18, as by the rivets 26. The grain-directing members 24 are therefore designed to insure that when the grain is lifted up by the lifters 18 and carried beyond the extreme height of the wheel such grain will fall upon the flange 24 and be directed thereby so as to fall upon the lip 27, falling thence into the throat 28, which has suitable connection with the delivery nozzle or spout 29. The compartment 11 is preferably provided with the curved bottom section 30, conforming to the periphery of the grain-wheel 17, thereby insuring that the last grain in the hopper will be taken up by one of the grain-lifters 18 and delivered into the throat 28 through the mediation of the devices hereinbefore described. I also locate longitudinally in the compartment 11 the shaft 31, which carries the guard or shield section 32, and since said guard is movable longitudinally upon the shaft 31 it may be moved toward the lip 27, and thereby insure that the grain will not casually slip off the edge of the wheel before it shall have reached the lip-section 27. The compartment 11 is designed to also be filled with grain, constituting a reserve supply for said compartment after the grain in the latter shall have been exhausted. I also prefer to provide the smaller compartment 33, which in this instance is cut off from the rear end of the compartment 10, said compartment 33 being found useful for a variety of purposes, as for a tool-box or the like. In some instances I prefer to form the grain-lifter 18 so as not to be rearwardly tapered, but rectangular in form, as indicated by the dotted lines 34 in Fig. 4.

The size of the various coöperating parts may, it will be understood, be formed so as to meet all of the varied requirements of such a machine, while any desired material may also be employed, as will be obvious, in order to obtain the best results, and while I have described the preferred combination and construction of parts I wish to conprehend all possible substitutes and equivalents which may be considered as falling fairly within the scope of my invention.

In order that only the requisite quantity of grain may be taken up and delivered by the grain-pockets 18, I provide the brush 34 or equivalent thereof, said brush being held in place by the spring-arm 35, secured in any preferred way to a convenient part of the hopper-section.

It will be obvious that the hopper-section may be provided with the lid-section 36, secured in place by suitable hinges or any other preferred way. In some instances it may be desirable to hold the stem-sections 19 in place by means of a thumb-screw 37, though it is thought that ordinarily the loop-section 20 may be made of proper size to reliably frictionally engage said stem-section.

Any suitable form of shovel may be employed instead of that presented in the drawings and various other changes may be made in the various parts without departing from the spirit of my invention.

Believing that the advantages and manner of using my improved seed-planter have thus been made clearly apparent from the foregoing description considered in connection with the accompanying drawings, futher refrerence to the details is deemed unnecessary.

Having thus fully described my invention, what I claim as new, and desire to secure by Letters Patent, is—

The herein-described planter comprising a suitable frame-section having a carrying-wheel and a furrow making and covering attachment, in combination with a suitable hopper-section; a grain-lifting wheel mounted in said hopper-section; means to rotate said wheel in the proper direction; a plurality of grain-lifting members 18 having anchoring-stems and a loop carried by the wheel adapted to engage said stems, said wheel also having the obliquely-disposed flange-sections 24 coöperating with each of said grain-lifters; a throat-section and a delivery-spout 29 connecting with said throat substantially as and for the purpose set forth.

In testimony whereof I affix my signature in presence of two witnesses.

JOHN L. PHELPS.

Witnesses:
A. B. JERNIGAN,
H. A. MCLEOD.